United States Patent
Tanaka et al.

(10) Patent No.: US 7,377,761 B2
(45) Date of Patent: May 27, 2008

(54) TIRE VULCANIZING MOLD

(75) Inventors: Hideaki Tanaka, Kodaira (JP); Mitsuyoshi Taneoka, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/589,821

(22) PCT Filed: Feb. 15, 2005

(86) PCT No.: PCT/JP2005/002239

§ 371 (c)(1),
(2), (4) Date: Feb. 7, 2007

(87) PCT Pub. No.: WO2005/080061

PCT Pub. Date: Sep. 1, 2005

(65) Prior Publication Data

US 2007/0166419 A1 Jul. 19, 2007

(30) Foreign Application Priority Data

Feb. 20, 2004 (JP) .............................. 2004-045293

(51) Int. Cl.
*B29C 35/02* (2006.01)
(52) U.S. Cl. .......................................................... 425/46
(58) Field of Classification Search ............... 425/28.1, 425/46, 47
See application file for complete search history.

(56) References Cited

U.S. PATENT DOCUMENTS

| | | | | |
|---|---|---|---|---|
| 2,030,861 A | * | 2/1936 | Fisher | 425/22 |
| 2,297,017 A | * | 9/1942 | Overman | 425/46 |
| 2,372,217 A | * | 3/1945 | MacMillan | 425/47 |
| 3,999,907 A | * | 12/1976 | Pappas | 425/46 |
| 4,411,175 A | * | 10/1983 | Takahashi et al. | 76/107.1 |
| 5,234,326 A | * | 8/1993 | Galli et al. | 425/46 |
| 5,290,163 A | * | 3/1994 | Katsumata et al. | 425/47 |

FOREIGN PATENT DOCUMENTS

| | | |
|---|---|---|
| JP | 7-314459 A | 12/1995 |
| JP | 2004-338182 A | 12/2004 |

* cited by examiner

*Primary Examiner*—James P. Mackey
(74) *Attorney, Agent, or Firm*—Sughrue Mion, PLLC

(57) ABSTRACT

High segmenting precision can be secured at a low production cost, and the dimensions of a gap between segmented pieces can be easily controlled. A tire vulcanizing mold (1) comprising an inner peripheral shape corresponding to the surface of a tire tread portion, and configured by assembling a plurality of circumferentially segmented pieces (1A), wherein at least one of the plurality of segmented pieces (1A) has a generally round-bar-shaped pin protector (100) on an assembling face (D) between an adjoining segmented piece (1A) in a projecting manner therefrom, and the adjoining segmented piece (1A) has a depressed groove (102) of generally arcuate in cross section for fitting the pin protector (100), on an assembling face (D) between the segmented pieces (1A) to be assembled with.

4 Claims, 6 Drawing Sheets

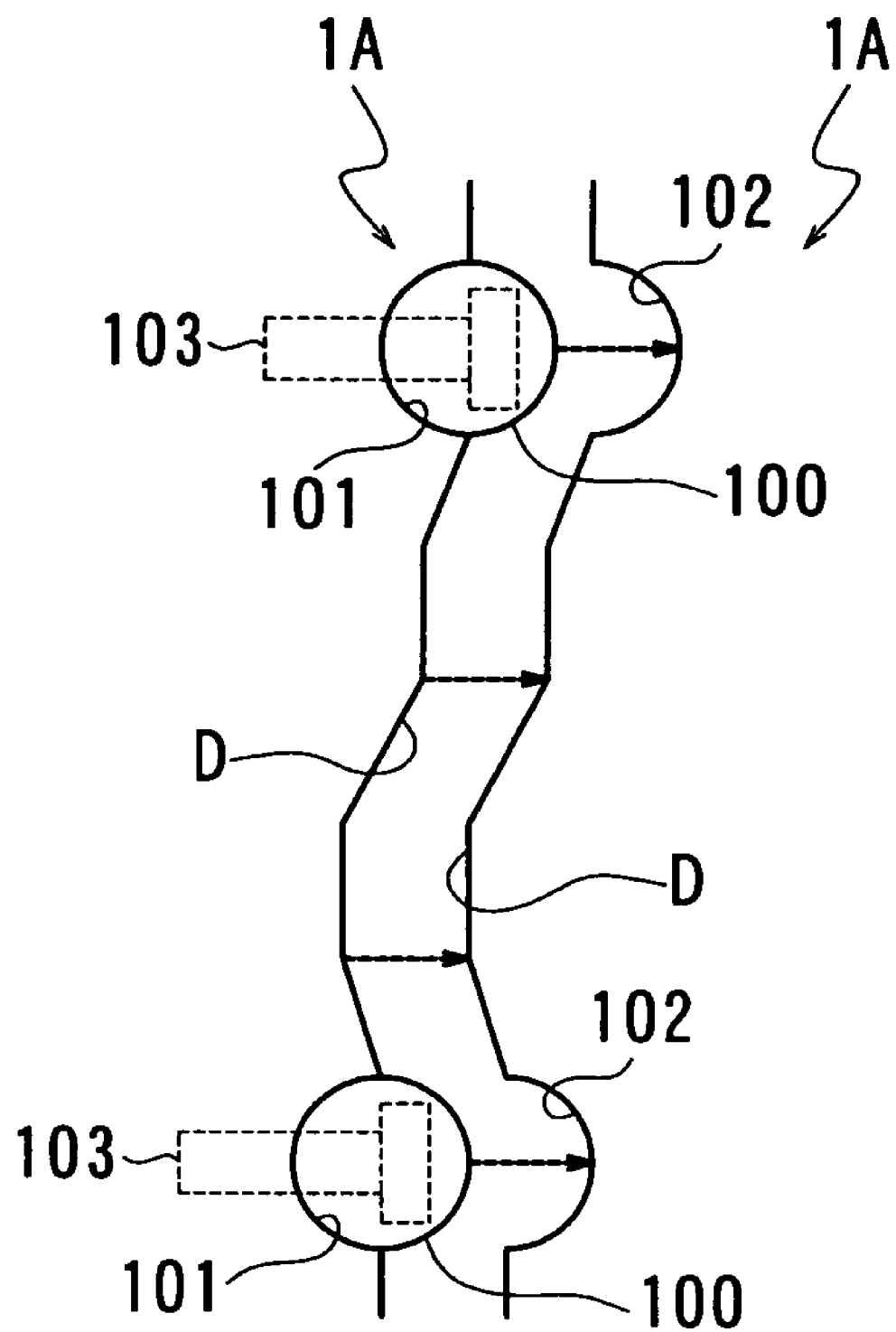

TIRE VULCANIZING MOLD

TECHNICAL FIELD

The present invention relates to a tire vulcanizing mold for molding a pattern of a tread portion of the tire, and a method for producing the same.

BACKGROUND ART

In molding a pattern of a tread portion on a tire, an unvulcanized green tire is pressed against an inner periphery of a tire vulcanizing mold on which ridges corresponding to the surface of the tire tread portion are formed. Thus, a groove pattern of the tire tread portion is molded.

There has been proposed the tire vulcanizing mold having a structure in which the mold is circumferentially segmented into a plurality of pieces, so that it is convenient for releasing a pressurization-molded tire (Patent document 1, for example). In this conventional art, first, a generally cylindrical member (a ring-shaped workpiece) having an inner peripheral shape corresponding to the surface of the tire tread portion is formed, and then cut at several points along the circumference and segmented into a plurality of segmented pieces, with wire electrodischarge machining (or with mechanical wire-cut machining by a wire-cut tool).

Patent document 1: Japanese Patent Application Publication (JP-B) No. 1-29686 (FIG. 1~FIG. 3)

DISCLOSURE OF THE INVENTION

However, the above conventional art has following problems.

That is, in the structure of the above conventional art, in which a member formed into generally cylindrical shape is cut and segmented into a plurality of segmented pieces, sections of the cut parts as they were cut are very rough. Because the segmented pieces must be precisely aligned in assembling them into a mold to mold a green tire, assembling faces (i.e. abutting faces, or hereinafter referred to as "segmenting faces" when appropriate) between the segmented pieces must be finished with high dimensional precision (hereinafter referred to as "segmenting precision" when appropriate). Therefore, in reality, a great number of man-hours for precise finishing of the segmenting faces have been required after the above cutting, which has resulted in an increase in production cost.

After being cut, the segmented pieces slightly decrease in size for cutting allowances in cutting, and finishing allowances in finishing. Therefore, to assemble the pieces as close as possible so as not to leave a gap therebetween, sometimes two identical cylindrical members have been required to produce one mold. This has also increased the production cost.

Further, in the structure as above, in which the segmenting faces of the segmented pieces with little gap therebetween are assembled, even the highly precise finishing as above could produce a tiny difference between the assembling shapes. So, it has been difficult to control the dimensions of the gap.

The present invention has been made in view of the above problems, and an object is to provide a tire vulcanizing mold which secures high segmenting precision and enables easy control of the dimensions of the gap between the segmented pieces at a low production cost, and to provide a method for producing the same.

Means for Solving Problems

To achieve the above object, a first aspect of the present invention is a tire vulcanizing mold comprising an inner peripheral shape corresponding to the surface of a tire tread portion, and configured by assembling a plurality of circumferentially segmented pieces, wherein at least one of said plurality of segmented pieces has a generally round-bar-shaped pin protector on an assembling face between an adjoining segmented piece in a projecting manner therefrom, and said adjoining segmented piece has a first depressed groove of generally arcuate in cross section to be fitted with said pin protector on an assembling face between said segmented pieces to be assembled with.

In the present invention, the generally round-bar-shaped pin protector, which is provided on one of the segmented pieces to be assembled in a projecting manner from the assembling face, and the corresponding first depressed groove, which is provided in the other of the segmented pieces, are fitted together. As long as the pin protector and the first depressed groove are precisely processed, this structure, in which the outer periphery of the round-bar fits the depressed groove, enables highly precise alignment in both circumferential and diametrical direction between the segmented pieces to be assembled. As for the rest of the segmenting face, the highly precise processing is not required. So, it can be used in a state of just being cut, for example.

As a result, a region requiring the highly precise processing can be reduced in comparison with the conventional structure, in which the whole segmenting face had to be finished highly precisely, thereby reducing the production cost. Further, this structure, in which the segmented pieces are aligned by fitting and assembling highly precisely finished small regions together, allows the sections of both segmented pieces to be opposed to each other with a gap therebetween in assembling. Thus, the preparation of the two identical cylindrical members (before segmenting) for producing one mold becomes unnecessary, which also leads to a reduction in the production cost.

Further, the dimensions of the gap can be easily controlled unlike the conventional structure, in which the segmenting faces of the segmented pieces with little gap therebetween are assembled. This is because, as described above, in a state where most part of the segmenting faces are facing the gap, the dimensions of the gap between the assembling faces of the segmented pieces can be determined only by fitting condition of the highly precisely finished, relatively small pin protector and the first depressed groove (more specifically, by a difference in diameter between the pin protector and the first depressed groove).

A second aspect of the invention is the tire vulcanizing mold according to the first aspect, wherein said at least one segmented piece has a second depressed groove of generally arcuate in cross section for fixing said pin protector.

A third aspect of the invention is the tire vulcanizing mold according to the second aspect, wherein said second depressed groove provided in said at least one segmented piece and said first depressed groove provided in said adjoining segmented piece have generally the same diameter.

A fourth aspect of the invention is the tire vulcanizing mold according to any one of the first to third aspects, wherein said at least one segmented piece is detachably fitted with said pin protector on said assembling face.

To achieve the above object, a fifth aspect of the invention is a method for producing a tire vulcanizing mold, wherein comprising the steps of: forming a generally cylindrical member having an inner peripheral shape corresponding to the surface of a tire tread portion; boring a radially penetrating, generally round hole in the generally cylindrical member on at least one of a plurality of predetermined segmenting faces along the circumference of said generally cylindrical member; segmenting said generally cylindrical member into a plurality of segmented pieces by cutting it at said plurality of predetermined segmenting faces including the one on which said generally round hole is bored; fitting and fixing a generally round-bar-shaped pin protector to a depressed groove of generally arcuate in cross section in one segmented piece of the two depressed grooves of generally arcuate in cross section, which are formed in two corresponding segmented pieces by said generally round hole being segmented by the above cutting; and assembling the two segmented pieces together by fitting the pin protector to the depressed groove in the other segmented piece of the two depressed grooves of generally arcuate in cross section, which are formed in two corresponding segmented pieces.

A sixth aspect of the invention is the method for producing the tire vulcanizing mold according to the fifth aspect, wherein the dimensions of a gap between assembling faces, which is left in assembling said two segmented pieces, is adjusted by adjusting a difference in diameter between said depressed groove in one segmented piece and said pin protector.

Effect of the Invention

In accordance with the present invention, high segmenting precision can be secured at a low production cost, and the dimensions of the gap between the segmented pieces can be easily controlled.

BRIEF DESCRIPTION OF THE DRAWINGS

FIG. 5 is an enlarged exploded side view of A part in FIG. 1;

EXPLANATION OF LETTERS OR NUMERALS

1 . . . tire vulcanizing mold, 1A . . . segmented piece, 1M . . . generally cylindrical member, 2A . . . tread surface, 100 . . . pin protector, 101 . . . depressed groove (second depressed groove), 102 . . . depressed groove (first depressed groove), 103 . . . fitting bolt, D . . . assembling face, Do . . . predetermined segmenting face, T . . . hole

BEST MODE FOR CARRYING OUT THE INVENTION

Now, an embodiment of the present invention will be described with reference to the drawings.

Figure 1:
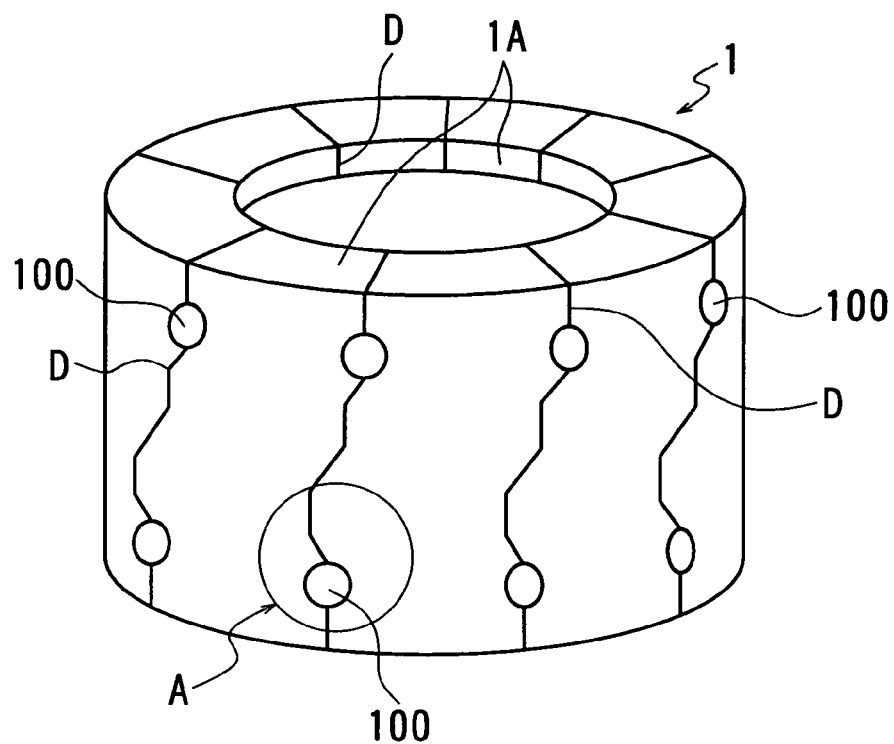
FIG. 1 is a perspective view of the overall structure of a tire vulcanizing mold according to an embodiment of the present invention.
Figure 2:
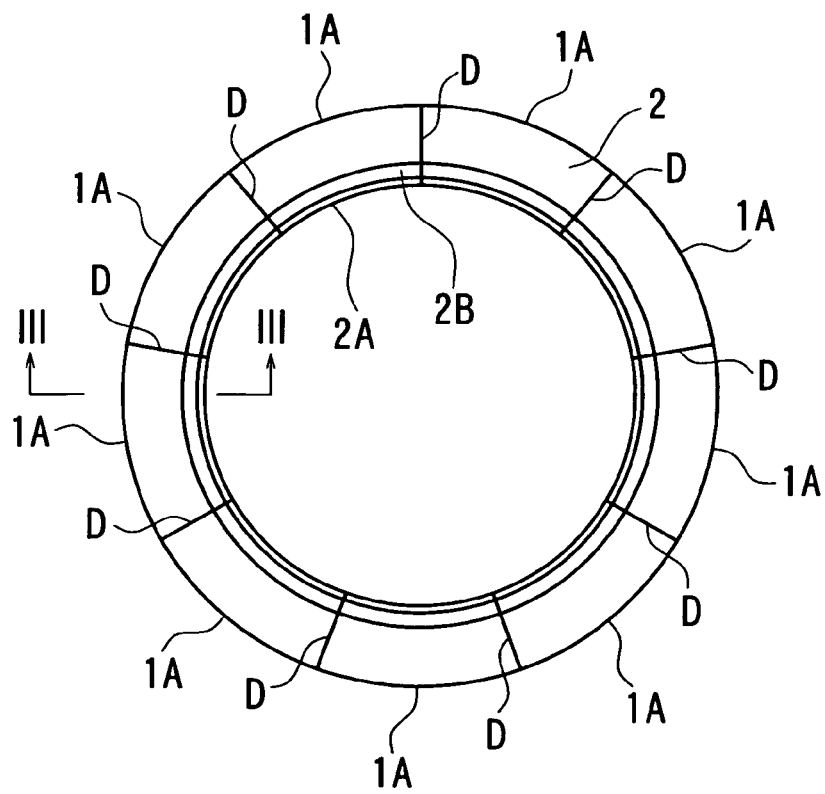
FIG. 2 is a top view of the overall structure of the tire vulcanizing mold shown in FIG. 1.

FIG. 1 is a perspective view of the overall structure of a tire vulcanizing mold according to an embodiment of the present invention, and FIG. 2 is a top view thereof (to clarify the structure, a later-described shoulder part 3 is not shown).

In FIG. 1 and FIG. 2, a tire vulcanizing mold 1 is configured by assembling a plurality of (in this example, nine) segmented pieces (sector molds) 1A, segmented (so-called curved partitioning) at a plurality of segmenting faces (curved faces) D along the circumference of the tire, into generally circular shape.

Figure 3:
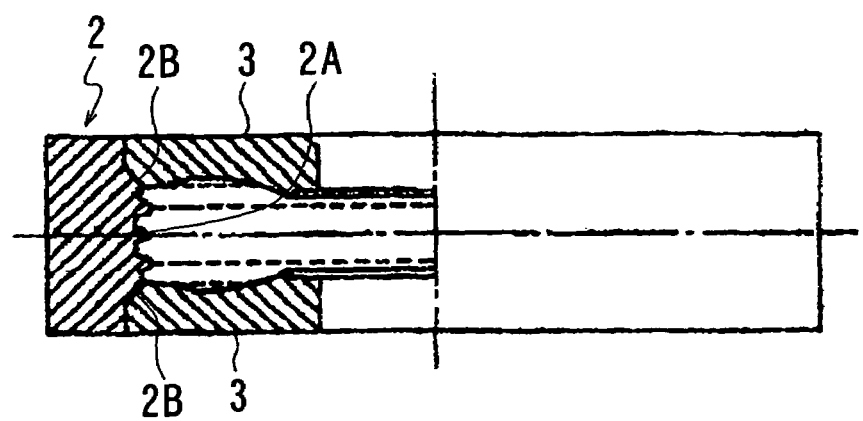
FIG. 3 is a cross-sectional view along III-III in FIG. 2.
Figure 4:
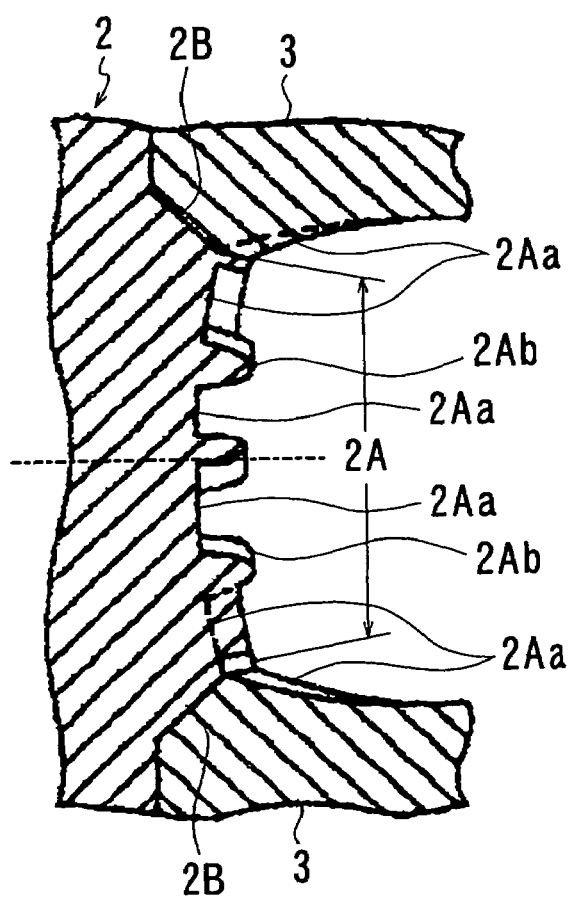
FIG. 4 is an enlarged view of an important part of FIG. 3.

FIG. 3 is a cross-sectional view along III-III in FIG. 2, and FIG. 4 is an enlarged view of an important part thereof. In FIG. 3 and FIG. 4, the mold 1 (in other words, each segmented piece 1A) has a tread portion 2 having a tread surface 2A, whose inner peripheral shape is corresponding to the surface of a tread portion of the tire, and shoulder parts 3 abutted against the tread portion 2 through abutting faces 2B. More specifically, the tread surface 2A is configured with a contour surface 2Aa corresponding to a road-contacting surface of the tire, and a plurality of projected parts 2Ab corresponding to grooves of the tire.

In the above basic configuration, the most distinctive feature of the present embodiment is the assembling structure of each segmented piece 1A with its adjoining segmented piece 1A.

FIG. 5 is an enlarged exploded side view of A part in FIG. 1.

In FIG. 5 and FIG. 1, each segmented piece 1A has a depressed groove 101 (a second depressed groove) of generally arcuate in cross section in one (on the clockwise side in FIG. 1 and FIG. 2) segmenting face (in other words, assembling face) D of the segmenting faces D and D of circumferentially both sides. This depressed groove 101 is provided on each segmenting face D at axially (perpendicularly to the plane of the paper in FIG. 2) several parts (in this example, two parts), for example. And a generally round-bar-shaped pin protector 100 is detachably fixed to each depressed groove 101 by a circumferentially penetrating fitting bolt 103, in a manner projecting from the segmenting face D (refer to FIG. 5).

Correspondingly, each segmented piece 1A has a depressed groove 102 (a first depressed groove) of generally arcuate in cross section, which has generally the same diameter with the depressed groove 101, in the other (on the counterclockwise side in FIG. 1 and FIG. 2) segmenting face (assembling face) D of the segmenting faces D and D of circumferentially both sides, to which the pin protector 100, provided on the circumferentially opposing (adjoining) segmented piece 1A to be assembled with, is fitted.

Now, the process of producing the tire vulcanizing mold 1 according to the present embodiment will be described step-by-step.

FIG. 6A to FIG. 6D is a diagram showing a production process (steps) of the mold.

Figure 6A:
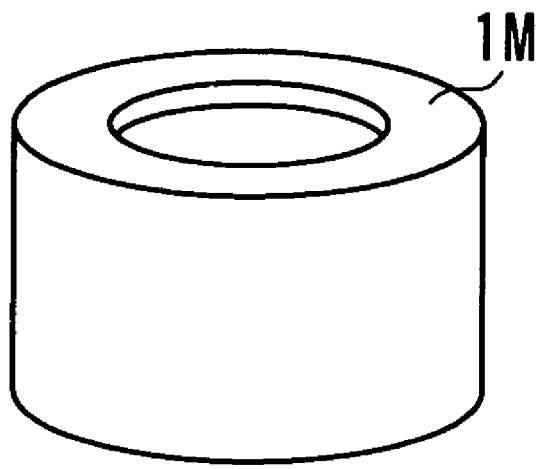
FIGS. 6A-6D are diagrams showing a production process (steps) of the tire vulcanizing mold shown in FIG. 1.

First, as shown in FIG. 6A, a generally cylindrical member 1M having an inner peripheral shape corresponding to the surface of the tread portion of a tire is formed with a known technique (lathe turning, etc.).

Figure 6B:
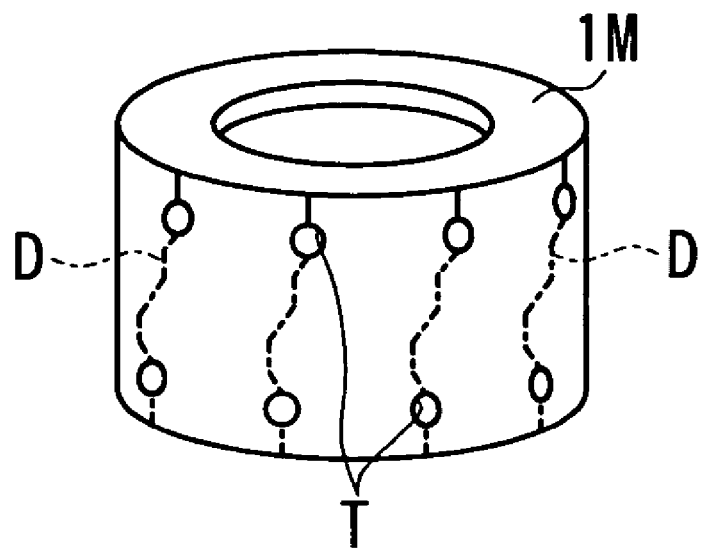

Then, as shown in FIG. 6B, a radially penetrating, generally round hole T is bored in the generally cylindrical member on a plurality of (in this example, nine) predetermined segmenting faces (predetermined segmenting lines) Do along the circumference of the generally cylindrical member 1M, which correspond to the above-described predetermined segmenting faces Do. These holes T are bored with relatively high precision, so as to satisfy a predetermined dimensional precision, as described later.

Figure 6C:
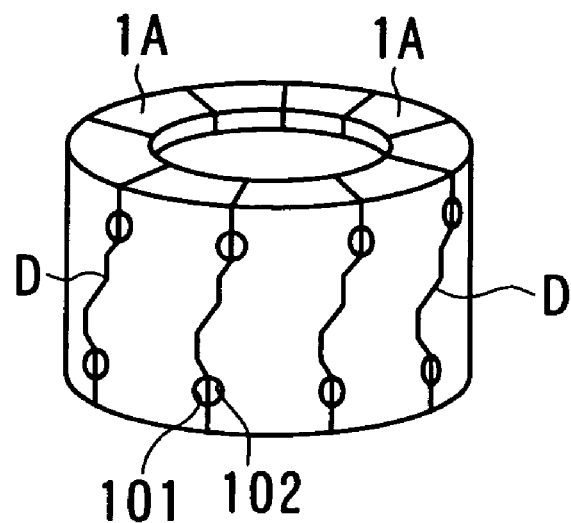

Then, as shown in FIG. 6C, the generally cylindrical member 1M is segmented into nine segmented pieces 1A by cutting (dividing) it at the nine segmenting faces including the parts on which the generally round holes T are bored. As this cutting requires no specially high precision as described later, it can be done with typical machining, including fusion cutting, wire-cutting, fine drilling, or fine sawing. And the generally circular hole T segmented in this cutting forms the depressed grooves 101 and 102 of generally arcuate in cross section in the two corresponding segmented pieces 1A and 1A, respectively.

Figure 6D:
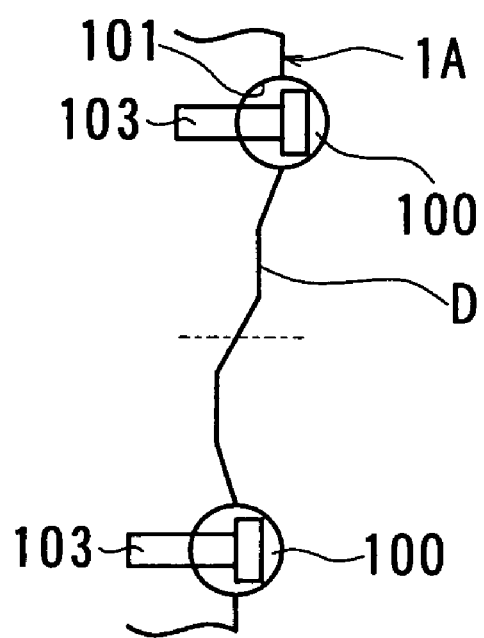

Then, as shown in FIG. 6D, the generally round-bar-shaped pin protector 100 is fitted to the depressed groove 101 in one segmented piece 1A of the depressed grooves 101 and 102, and fixed thereto with the fitting bolt 103.

When assembling all the segmented pieces 1A in molding a tire, two segmented pieces 1A and 1A are assembled by fitting the pin protector 101, fitted to the depressed groove 101 of each segmented piece 1A, to the depressed groove 102 of the adjoining segmented piece 1A to be assembled with. This is done at all the joining parts, connecting all the pieces 1A together, and the tire vulcanizing mold 1 is completed.

In connecting the pieces, the dimensions of the gap between the assembling faces D, which is left in assembling two segmented pieces 1A and 1A, is adjusted by adjusting a difference in diameter between the depressed groove 102 in the segmented piece 1A and the pin protector 100 on the segmented piece 1A to be assembled.

As hereinbefore described, in the tire vulcanizing mold 1 according to the present embodiment, the generally round-bar-shaped pin protector 100 provided on one of the segmented pieces 1A to be assembled in a projecting manner from the assembling face D, and the corresponding first depressed groove 102 provided in the other of the segmented pieces 1A are fitted together.

Figure 7:
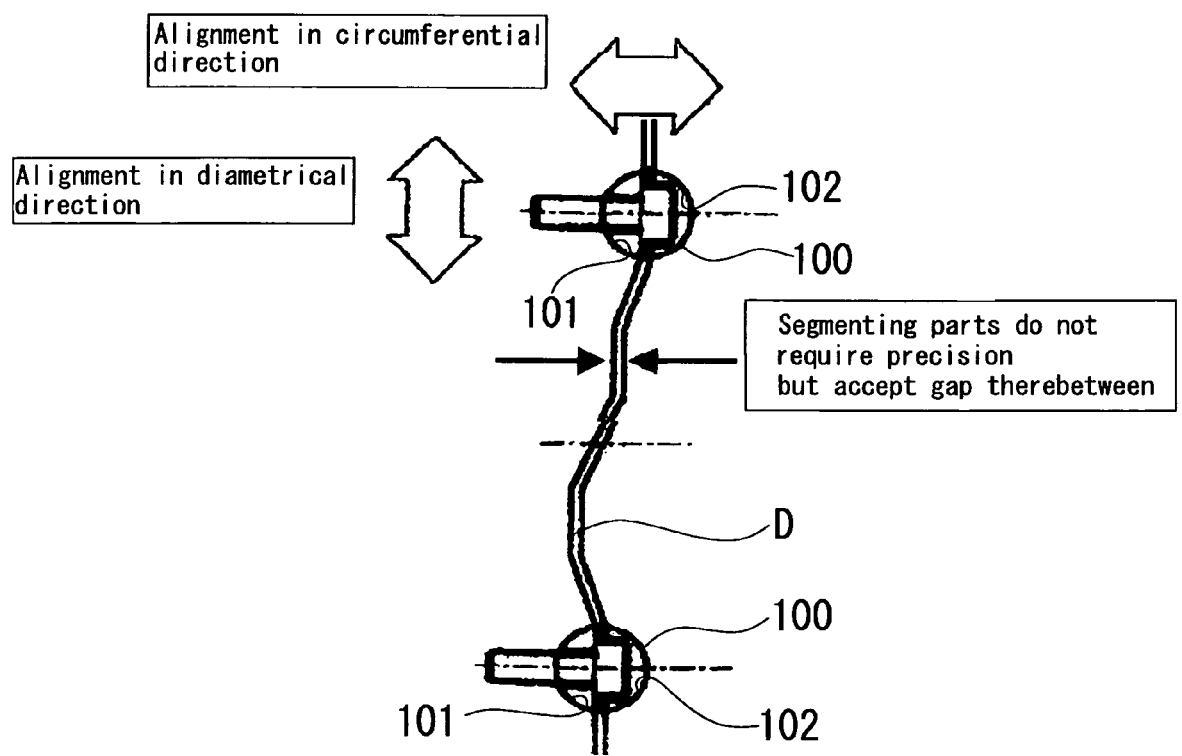
FIG. 7 is a diagram showing behavior in alignment.

As long as the pin protector 100 (including the depressed groove 101 to be fitted with it) and the depressed groove 102 are precisely processed, this structure, in which the outer periphery of the round-bar fits the depressed groove, enables highly precise alignment in both circumferential and diametrical direction between the segmented pieces 1A to be assembled, as shown in FIG. 7. And misalignment between the segmented pieces, and resulting misalignment of the above-described projected parts (the pattern) 2Ab and collision damage, which occur with a currently proposed flat-plate protector, can be prevented. As for the segmenting faces other than the pin protector 100 (including the depressed groove 101 to be fitted with it) and the depressed groove 102, the highly precise processing is not required. So, they can be used in a state of just being cut, for example. Also, the above-described precise alignment between segmented pieces can prevent relatively nondurable parts (e.g. parts made of aluminum) of the segmented pieces 1A from being damaged in assembling.

As a result, a region requiring the highly precise processing can be reduced in comparison with the conventional structure, in which the highly precise finishing had been required for the whole segmenting face D, thereby reducing the production cost. Further, this structure, in which the segmented pieces are aligned by fitting and assembling highly precisely finished small regions together, allows the sections of both segmented pieces 1A and 1A to be opposed to each other with a gap therebetween, in assembling. Thus, preparation of two identical cylindrical members 1M for producing one mold 1 becomes unnecessary, which also leads to a reduction in the production cost.

Further, as described above, in a state where most part of the segmenting faces D are facing the gap, the dimensions of the gap between the assembling faces of the segmented pieces 1A and 1A can be determined only by the fitting condition of the highly precisely finished, relatively small pin protector 100 and the depressed groove 102 (more specifically, a difference in diameter between the pin protector 100 and the depressed groove 102, as described above). For example, if the diameter of the pin protector 100 is increased relative to the diameter of the depressed groove 101 and 102 (either by replacing the protector 100 or modifying the depressed groove 102), the gap is made larger, and if the above is done the other way around, the gap is made smaller. Thus, unlike the conventional structure, in which the segmenting faces of the segmented pieces with little gap therebetween are assembled, the dimensions of the gap between the segmented pieces 1A and 1A can be easily controlled. In particular, by making the pin protector 100 detachable with the bolt 103, the pin protectors 100 can be prepared in slightly different diameters, and replaced. This also enables an easy adjustment of the dimensions between the gap, as well as easy maintenance, including replacement of a worn pin protector 100.

In the above embodiment, each segmenting face D between the segmented pieces 1A and 1A has axially two joints, at which the pieces are joined by the depressed groove 101, 102 and the pin protector 100. However, it is not limited to this, and may have axially only one joint. Also in the above embodiment, all the segmented pieces 1A have a structure in which they are joined with their adjoining segmented pieces 1A (and the gap therebetween is controlled) through the pin protectors 100. However, they are not limited to be in such a structure, and some of them may have the conventional structure, which differs from the above joining structure. In other words, as long as at least one of the many joints between the segmented pieces 1A has the above-described joining structure in which the pin protector 100 is used, a reduction in production cost as well as an easy adjustment of a gap, which are primary effects of the present invention, can be obtained, at least in comparison with the case where all the joints have the conventional structure.

Although the present invention has been described by taking the case being applied to a tire vulcanizing mold, it is not limited to that. It can be generally applied to segmented molds needing a function of a protector, or a knock pin.

What is claimed is:

1. A tire vulcanizing mold comprising an inner peripheral shape corresponding to the surface of a tire tread portion, and configured by assembling a plurality of circumferentially segmented pieces, wherein at least one of said plurality of segmented pieces has generally round-bar-shaped pin protectors on an assembling face between an adjoining segmented piece in a projecting manner therefrom, and said adjoining segmented piece has first radial depressed grooves of generally arcuate in cross section to be fitted with said pin protectors on an assembling face between said segmented pieces to be assembled, and said at least one of the segmented pieces has second radial depressed grooves, which are generally arcuate in cross section and provided plurally and axially spaced in a radial direction for fixing the pin protectors.

2. The tire vulcanizing mold according to claim 1, wherein said second depressed grooves provided in said at least one segmented piece and said first depressed grooves provided in said adjoining segmented piece have generally the same diameter.

3. The tire vulcanizing mold according to claim 1, wherein said at least one segmented piece is detachably fitted with said pin protector on said assembling face.

4. The tire vulcanizing mold according to claim 2, wherein said at least one segmented piece is detachably fitted with said pin protector on said assembling face.

* * * * *